United States Patent
Mukojima

[19]

[11] Patent Number: 5,930,273
[45] Date of Patent: Jul. 27, 1999

[54] STM-N SIGNAL ERROR CORRECTION CODING SYSTEM AND METHOD

[75] Inventor: Toshiaki Mukojima, Tokyo, Japan

[73] Assignee: Oki Electric Industry Co., Ltd., Tokyo, Japan

[21] Appl. No.: 08/834,106

[22] Filed: Apr. 14, 1997

[30] Foreign Application Priority Data

Apr. 18, 1996 [JP] Japan .................................. 8-096711

[51] Int. Cl.$^6$ .................................................. H03M 13/00
[52] U.S. Cl. ....................................................... 371/37.02
[58] Field of Search .......................... 371/37.01, 37.02, 371/37.03; 370/244

[56] References Cited

U.S. PATENT DOCUMENTS 5,574,717  11/1996  Tomizawa et al. .................... 370/244

FOREIGN PATENT DOCUMENTS 0 684 712    11/1995  European Pat. Off. .
0 849 972 A2  6/1998  European Pat. Off. .

OTHER PUBLICATIONS

Yoshiaki Yamabayashi et al., A Bit–Interleaved Hamming Code for Linearly Repeatered Terrestrial Fiber Optic Transmission Systems, pp. 6–1–6–3.

M. Tomizawa et al., "Foward Error Correcting Codes for Arbitrary Multiplexing Levels in SDH Fiber Optical Transmission Systems," B–1704, p. 520 (1995).

V. Paxal et al., "Error–Correction Coding for High–Speed Optical Transmission Systems Based on the Synchronous Digital Hierarchy," *European Transactions on Telecommunications and Related Technologies*, vol. 4, No. 6, pp. 623–628, (1993).

Wayne D. Grover et al., "Design and Characterization of an Error–Correcting Code for the SONET STS–1 Tributary," *IEEE Transactions on Communications*, vol. 38, No. 4, pp. 467–476 (1990).

Y. Yamabayashi et al., Bit–interleaved Hamming code for linearly repeatered terrestrial SDH transmission systems, *Electronics Letters*, vol. 31, No. 8, pp. 608–609 (1995).

*Primary Examiner*—Albert DeCady
*Assistant Examiner*—Shelly A. Chase
*Attorney, Agent, or Firm*—Venable; Robert J. Frank; Michael A. Sartori

[57] ABSTRACT

Transmission error correction is performed by generating an extremely small number of error correction code bits even when the value of N in STM-N (Synchronous Transport Module Level N) becomes large. The sending signal input terminal receives four AU-4 signals, and the serial/parallel conversion circuit converts the signals to eight parallel signals. The number of check bits required for encoding eight parallel bits is 14. The error correction encoder provided for the first bit divides a received data stream by a polynomial and sends the resulting remainder to the check bit output terminal 1 as the check bit. Each of the error correction encoders calculates the check bits of data streams using the polynomial and sends the results to check bit output terminals 2–8. The {n, k} shortened Hamming code is executed for each bit by inserting these check bits into undefined bytes in the multiplex-section overhead (MSOH).

4 Claims, 12 Drawing Sheets

ERROR CORRECTION
ENCODING CIRCUIT

STM-N SIGNAL ERROR CORRECTION CODING SYSTEM AND METHOD

BACKGROUND OF THE INVENTION

1. Field of the Invention

The present invention relates to an STM-N (Synchronous Transport Module Level N) signal error correction encoding/decoding method and STM-N signal error correction encoding/decoding circuits in use for the STM (Synchronous Transfer mode). The method and circuits may be used, for example, in error correction encoding/decoding in an SDH (Synchronous Digital Hierarchy) fiber optical transmission system.

2. Description of the Related Art

Recently, the SDH fiber optical transmission system has been remarkably researched. The following are some of the documents dealing with this technology:

Document 1: Yoshiaki YAMABAYASHI, Masahito TOMIZAWA, Tomoyoshi KATAOKA, Yukiko KOBAYASHI, and Kazuko HAGIMOTO. OAA" 94, ThA6: NTT "A Bit-Interleaved Hamming Code for Linearly Repeated Terrestrial Fiber Optic Transmission Systems"

Document 2: Masaki Tomizawa, Yoshiaki Yamabayashi, Norio Kobayashi, and Kazuo Hagimoto. 1995. "Study on the Error Correction Code of an SDH Fiber Optical Transmission System," Electronic Information Communication National Convention B-1074.

Figure 2A:
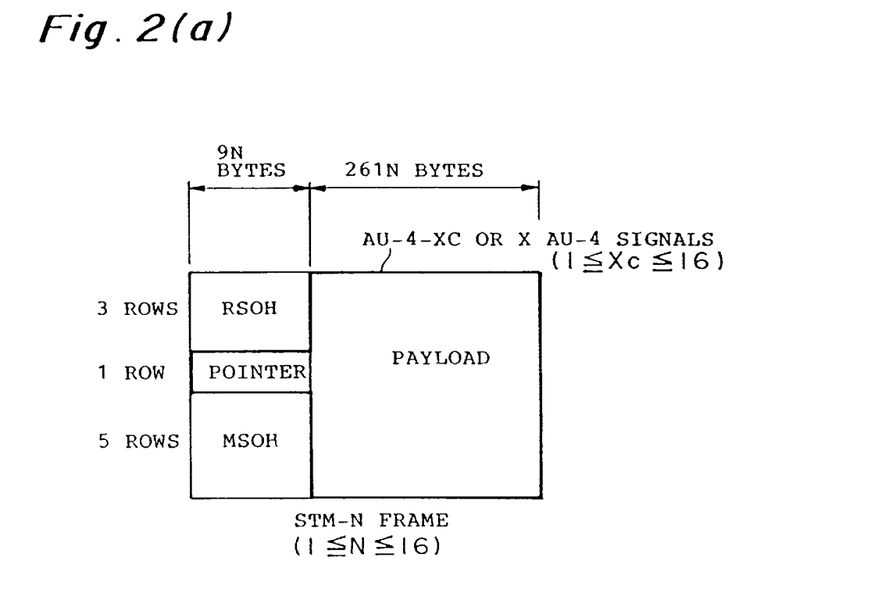
Figure 2B:
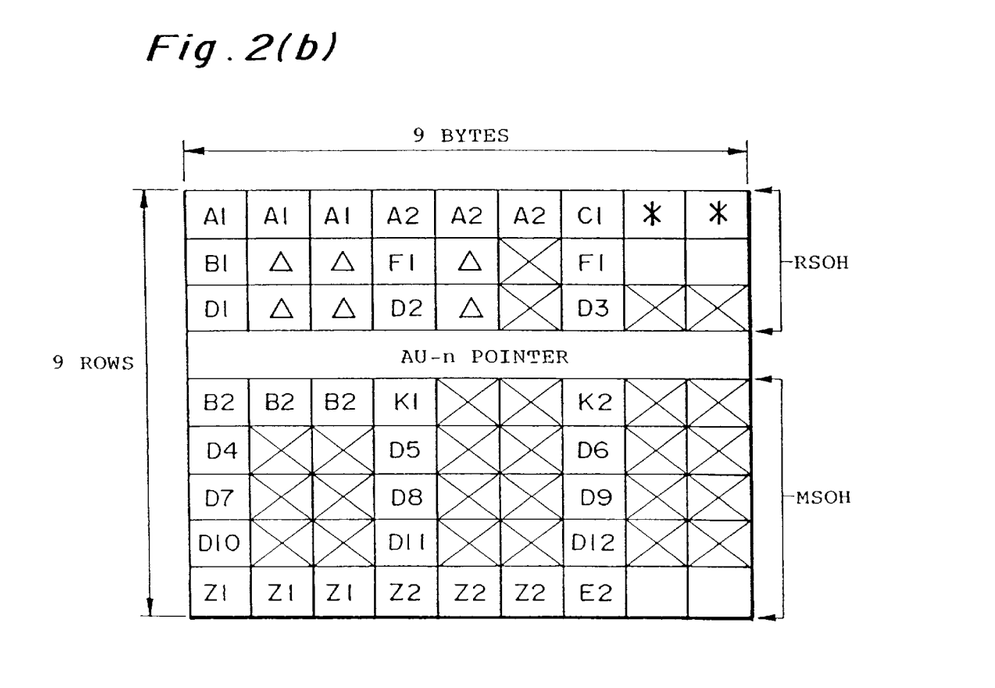

The above documents propose the forward error correction code (FEC) compatible with the SDH. This forward error correction circuit, installed on a terminal equipment, has the check bits stored in the undefined byte area in the multiplex-section overhead (MSOH) shown in FIG. 2. In FIG. 2(b), "X" indicates a byte for an international standard code reserved for future use, "Δ" indicates a media-dependent byte, and * indicates a byte not scrambled.

The STM-N ($1 \leq N \leq 16$) signal is in one of the following two forms: one form is that various concatenation paths VC(virtual container)-4-Xc are mapped with the use of ATM (Asynchronous Transfer Mode) cells and the other form is that N AU-4 signals, each of which is a VC-4 to which the AU (Administrative Unit) pointer is added, are byte-multiplexed.

When error correction encoding is performed on AU-4-Xc of the STM-N signal, various concatenation paths are mapped, on an SDH terminal unit, into X AU-4 signals each of which is AU-4-Xc generated by adding the AU pointer to VC-4-Xc. Therefore, the error correction circuit performs encoding on AU-4, and X encoding circuits and X decoding circuits are used.

When N AU-4 signals, each of which has the AU pointer in VC-4, are byte-multiplexed, N STM-1 signals each containing AU-4, check bytes, and the SOH are byte-multiplexed. This method may be used for any STM-N system since the FEC encoding circuit encodes one AU-4 at a time. The following two types of code are provided for the FEC code of an SDH-compatible FEC encoding circuit.

(1) Parallel type shortened Hamming code: One-bit correction is performed on the eight parallel bits of AU-4 at a time (18864 bits/8=2358 bits). Twelve bytes are required for the check bits. When the encoding target is AU-4-Xc ($2 \leq X \leq 16$) or X ($2 \leq X \leq 16$) AU-4 signals, X encoding circuits and X decoding circuits are used.

(2) Serial type shortened Hamming code: One-bit correction is performed on one AU-4 at a time (18864 bits=241 columns×9 rows/1 column+{9 columns×1 row×8 bits). Two bytes are required for the check bits. When the encoding target is AU-4-Xc ($2 \leq X \leq 16$) or X ($2 \leq X \leq 16$) AU-4 signals, X encoding circuits and X decoding circuits are used.

However, the conventional error correction encoding/decoding method described above uses AU-4 as the encoding target for both the serial type and parallel type shortened Hamming codes. Therefore, when the shortened Hamming code is used for AU-4-Xc ($2 \leq X \leq 16$) or X ($2 \leq X \leq 16$) AU-4 signals in the STM-N ($2 \leq N \leq 16$) signal as the error correction code, X encoding circuits and X decoding circuits are required. And, the serial type shortened Hamming code requires 2×X bytes of check bits, and the parallel type shortened Hamming code requires 12×X bytes of check bits, showing that the required check bits are X times as many as the check bits of the AU-4 signal.

This causes the following two problems concerning larger value of N in STM-N: a relatively large number of check bits that must be created in the section overhead degrades (1) the transmission efficiency and (2) check bit generation and decoding takes time. To solve these problems, the STM-N signal error correction encoding/decoding method and STM-N signal error correction encoding/decoding circuits have been requested which can correct transmission errors simply by generating an extremely small number of check bits (error correction code) even when the value of N in STM-N becomes larger.

SUMMARY OF THE INVENTION

It is an object of the present invention to provide an error correction coding system and method for correcting transmission error using only a small number of check bits, in spite of larger value N of STM-N.

According to an aspect of the present invention, the STM-N (N: positive integer) signal error correction coding system comprises administrative unit generating means for generating a plurality of administrative units, each of the administrative units including a virtual container for accommodating transmission data and a pointer having information on multiplexing of the data, error correction code generating means for generating one error correction code for the whole of the plurality of administrative units, and STM-N signal generating means for generating STM-N signal having overhead section and payload section by setting the error correction code in the overhead and setting the plurality of administrative units in the payload section.

According to another aspect of the present invention, the STM-N signal error correction coding method comprises the first step of generating a plurality of administrative units, each of the administrative units including a virtual container for accommodating transmission data and a pointer having information on multiplexing of the data, the second step of generating one error correction code for the whole of the plurality of administrative units, and the third step of generating STM-N signal having overhead section and payload section by setting the error correction code in the overhead and setting the plurality of administrative units in the payload section.

The error correction code system and method according to the present invention performs one error correction on the whole of a plurality of administrative units, thus avoiding a sharp increase in transmission information with the value N of the STM-N increasing.

BRIEF DESCRIPTION OF THE DRAWINGS

The present invention will be understood more fully from the detailed description and the accompanying drawings below of the preferred embodiments of the invention.

In the drawings:

FIG. 1 is a block diagram showing the error correction encoding/decoding circuits of the first embodiment according to the present invention, in which FIG. 1 (a) illustrates the error correction encoding circuit using the parallel type shortened Hamming code, and FIG. 1 (b) illustrates the error correction decoding circuit using the parallel type shortened Hamming code;

FIG. 2 is a diagram showing the STM-N frame, in which FIG. 2 (a) illustrates the encoding range in the STM-N frame, and FIG. 2 (b) illustrates byte attributes in the STM-N frame;

FIG. 3 is a detailed block diagram showing the error correction encoding system using the parallel type shortened Hamming code of the first embodiment, where FIG. 3 (a) illustrates the error correction encoding circuit, and FIG. 3 (b) illustrates the error correction encoder therein;

FIG. 4 is a block diagram showing the error correction decoding system using the parallel type shortened Hamming code of the first embodiment, where FIG. 4 (a) illustrates the error correction decoding circuit, and FIG. 4 (b) illustrates the error correction decoder therein;

FIG. 6 is a block diagram showing the error correction encoding/decoding circuits of the second embodiment, where

DESCRIPTION OF THE PREFERRED EMBODIMENTS

Referring to the attached drawings, there is shown an embodiment according to the present embodiment.

FIRST EMBODIMENT

The first embodiment performs the error correction function on AU-4-Xc or X×AU-4 of the STM-N signal with the use of the parallel type shortened Hamming code. To do so, it provides encoding and decoding circuits to encode or decode 8 parallel bits, one unit of AU-4-Xc or X×AU-4 at a time instead of one unit of AU-4 at a time.

Figure 1A:
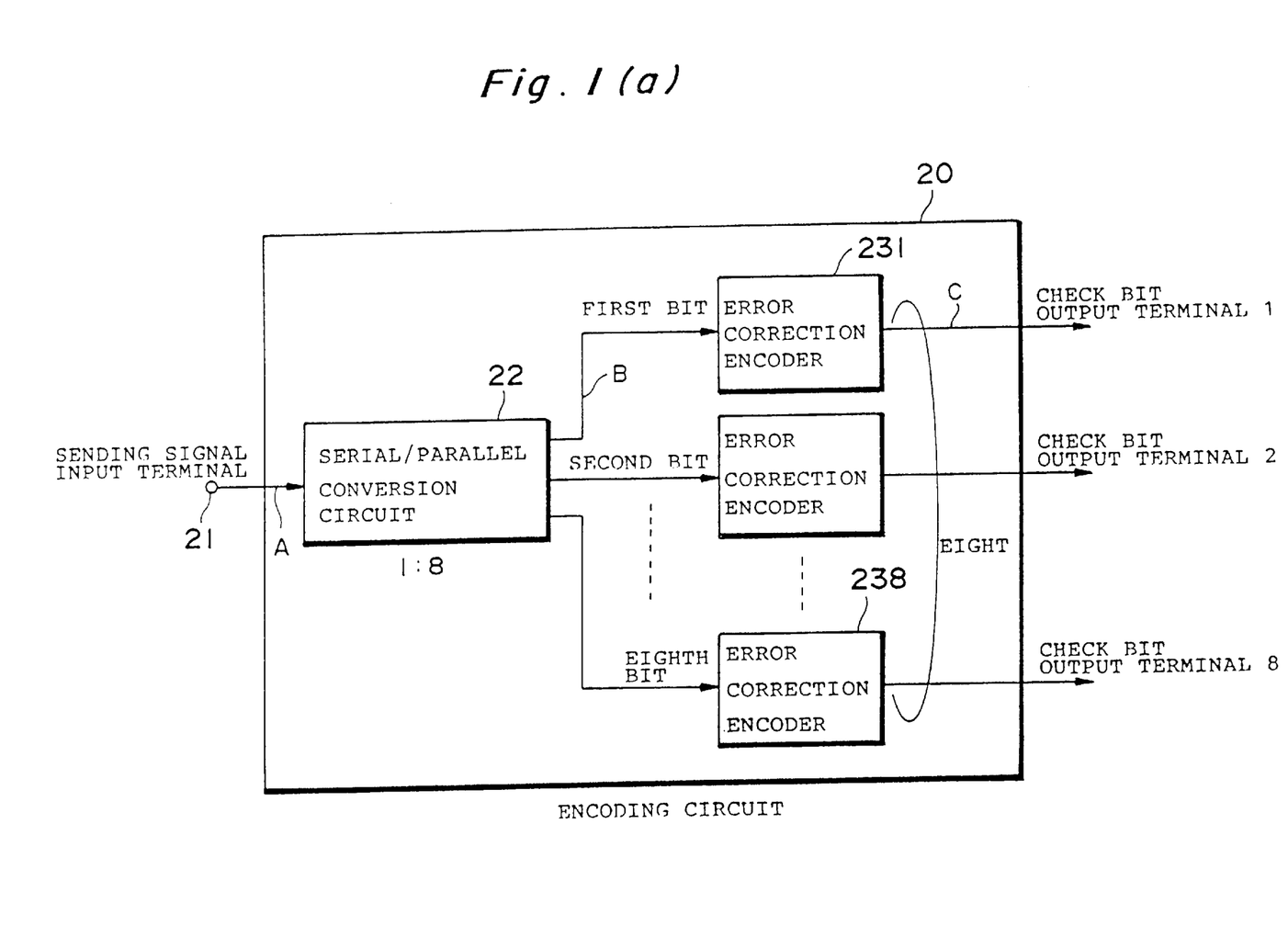
Figure 1B:
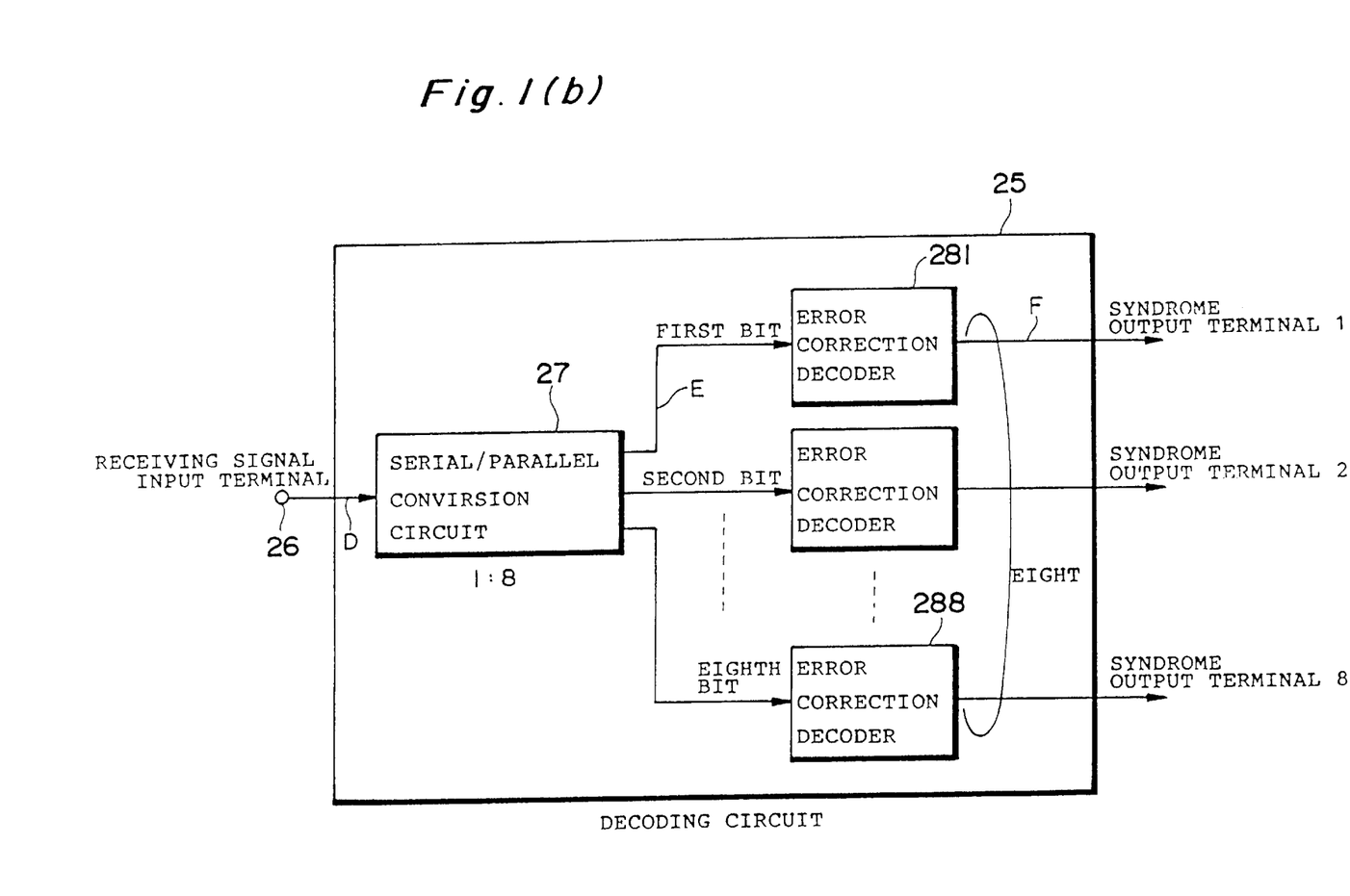

FIG. 1 (a) is a functional configuration diagram showing the error correction encoding circuit 20 using the parallel type shortened Hamming code according to the first embodiment of the present invention, and FIG. 1 (b) is a functional configuration diagram showing the error correction decoding circuit 25 using the parallel type shortened Hamming code according to the first embodiment of the present invention.

As shown in FIG. 1(a), the error correction encoding circuit 20 using he parallel type shortened Hamming code includes the serial/parallel conversion circuit 22 and the error correction encoders 231–238.

Upon receiving AU-4-Xc ($2 \leq X \leq 16$) or X AU-4 ($2 \leq X \leq 16$) signal of the STM-N signal at the sending signal input terminal 21 (for example, with N=4 and X=4), the serial/parallel conversion circuit 22 of the error correction encoding circuit 20 using the parallel type shortened Hamming code converts the signal to an 8-bit parallel signal and sends the 8-bit parallel signal to the error correction encoders 231–238. All of the error correction encoders 231–238 are of the same configuration. For example, the error correction encoder 231 performs {n, k} shortened Hamming encoding to execute one-bit error correction and sends the resulting check bit to the check bit output terminal 1.

In FIG. 1(b), the error correction decoding circuit 25 using the parallel type shortened Hamming code includes the serial/parallel conversion circuit 27 and the error correction decoder 281–288.

The serial/parallel conversion circuit 27 converts the STM-N signal received at the receiving signal input terminal 26 to an 8-bit parallel signal and sends the resulting signal to the error correction decoders 281–288. All of the error correction decoders 281–288 are of the same configuration. For example, the error correction decoder 281 detects an error bit position of the 8-bit parallel signal, corrects the data at the error bit position, and sends the data to the syndrome output terminal 1.

Figure 3A:
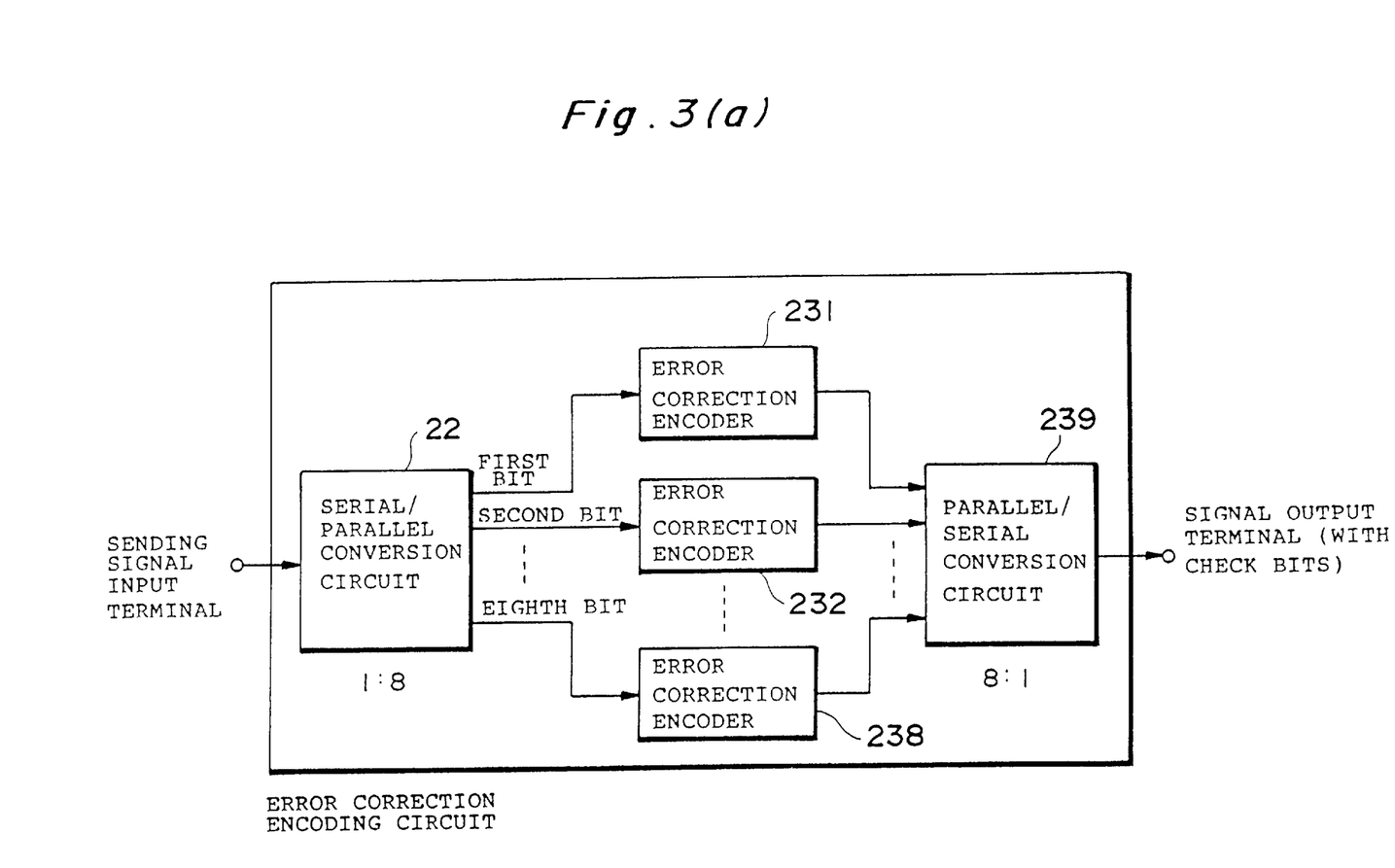
Figure 3B:
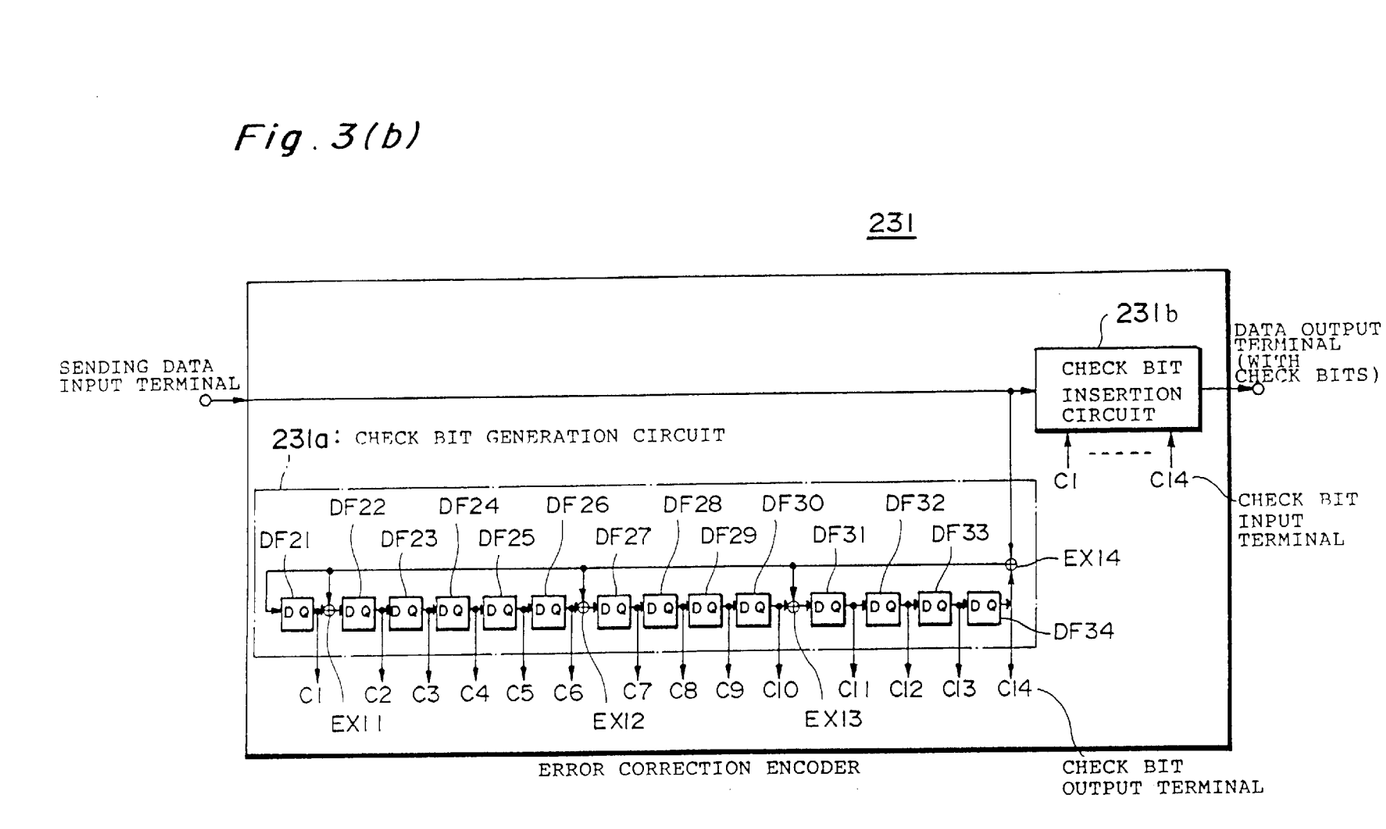

FIG. 3 is a diagram showing the functional configuration of the error correction encoder 231. As shown in FIG. 3(b), the error correction encoder 231 includes the check bit generation circuit 231a and the check bit insertion circuit 231b. The check bit generation circuit 231a includes the D flip-fop circuits DF21–DF34 and exclusive OR circuits Ex11–Ex14 to form a cyclic code generation circuit.

The check bit generation circuit 231a generates the {n, k} shortened Hamming codes C1–C14 for one-bit error correction from the STM-N signal received at the sending signal input terminal and sends the resulting codes to the check bit insertion circuit 231b. The check bit insertion circuit 231b then inserts the check bits C1–C14 into the vacant bit positions (FIG. 2) in the section overhead of the STM-N signal and sends the resulting data to the output terminal (with check bits). The parallel/serial conversion circuit 239 converts the data (with check bits), sent from the error correction encoders 231–238, to serial data and sends it to the output terminal.

Figure 4A:
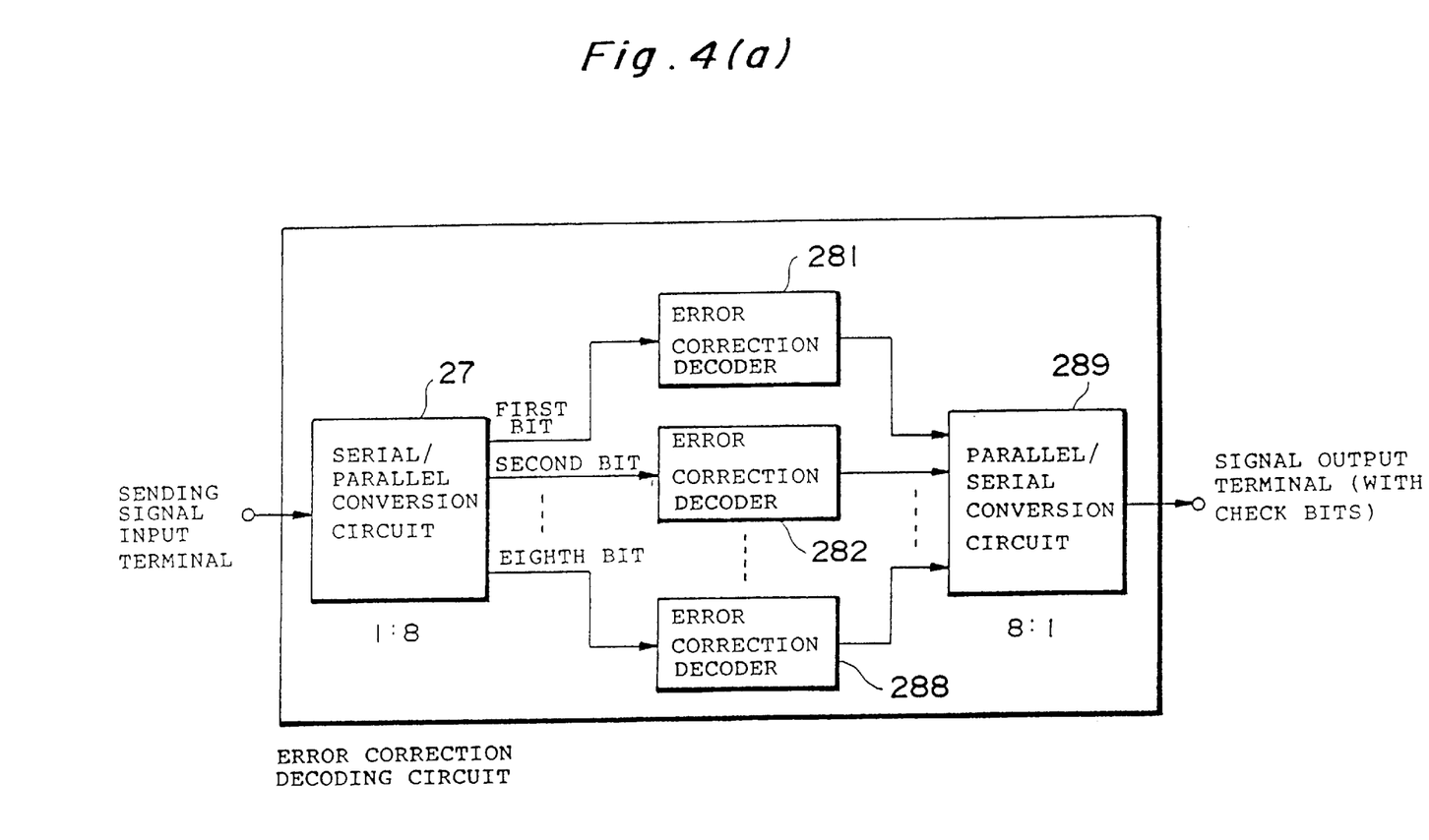
Figure 4B:
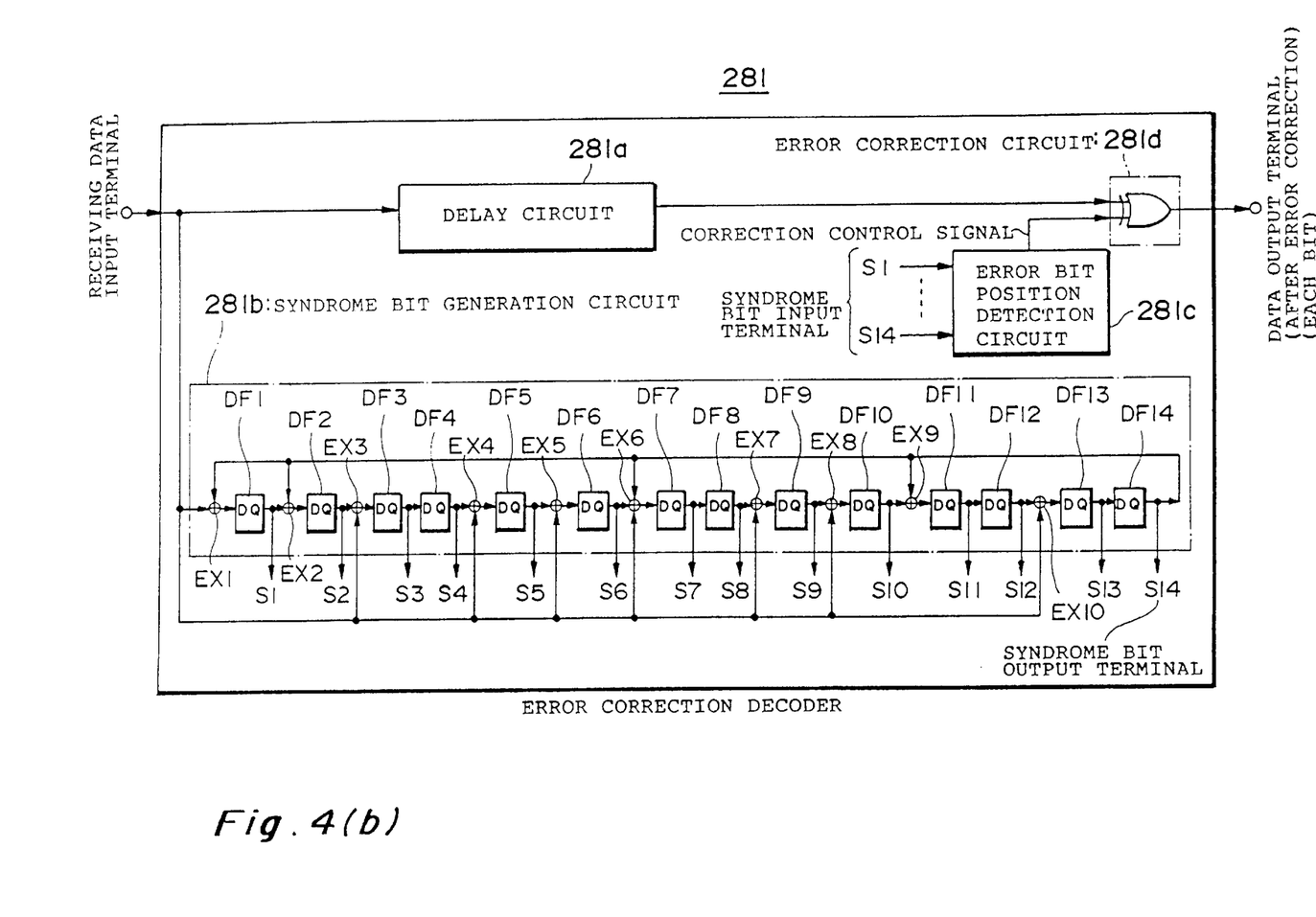

FIG. 4 is a diagram showing the functional configuration of the error correction decoder 281. In FIG. 4(b), the error correction decoder 281 includes the delay circuit 281a, syndrome bit generation circuit 281b, error bit position detection circuit 281c, and error correction circuit 281d. The syndrome bit generation circuit 281b includes the D flip-flop circuits DF1–DF12 and exclusive OR circuits Ex1–Ex10.

The delay circuit 281a delays the STM-N signal received at the receiving data input terminal for the period of time equivalent to one frame of information bits, and sends the resulting signal to the error correction circuit 281d. The syndrome bit generation circuit 281b calculates the syndrome of the STM-N signal received at the receiving data input terminal and sends the syndrome bits S1 to S14 to the error bit position detection circuit 281c. The error bit position detection circuit 281c then detects an error bit position based on the syndrome bits S1–S14, generates the error control signal, and sends it to the error correction circuit 281d. The error correction circuit 281d corrects the error signal of the STM-N signal, delayed by the delay circuit 281a, using the above-mentioned error control signal, then sends the corrected data to the data output terminal. For example, if the correction control signal is 1 indicating that there is an error and if the signal from the delay circuit 281a is 1, the circuit performs exclusive OR on them to output corrected data as 0; if the correction control signal is 1 and if the signal from the delay circuit 281a is 0, the circuit outputs 1. On the other hand, if the correction control signal is 0 indicating that there is no error and if the signal from the delay circuit 281a is 1 if the correction control signal is 0 and, the circuit outputs 1; if the signal from the delay circuit 281a is 0, the circuit outputs 0. The parallel/serial conversion circuit 289 converts the corrected data sent from the error correction decoders 281–288 to serial data for output.

The following explains the operation of the circuits shown in FIG. 1: error correction encoding circuit 20 and error correction decoding circuit 25 which use the parallel type shortened Hamming code. In the following discussion, N=4 and X=4 are assumed for AU-4-Xc ($2 \leq X \leq 16$) or X AU-4 ($2 \leq X \leq 16$) signals.

Both the AU-4-4c and four AU-4 signals each have 75456 bits (=$\{261 \times 4 \times 9 \times 8\} + \{9 \times 4 \times 8\}$) in one frame. This signal is sent to the sending signal input terminal 21 and is converted to 8-parallel-bit signals by the serial/parallel conversion circuit 22. There are 9432 (=$\{261 \times 4 \times 9 \times 8\} + \{9 \times 8\}/8$) 8-parallel-bit signals in one frame, and these are used for error correction.

In general, the $\{n, k\}$ shortened Hamming code used for one-bit error correction must satisfy the following formula (1):

$$2^{(n-k)} \geq n+1 \quad (1)$$

where, n is the length (block size) of the code word containing bit data for which error correction encoding is performed and the check bits used for error correction encoding, and k is the length of bit data that is encoded. n−k is the number of check bits used for error correction encoding. From formula (1), the number of check bits used for 8-parallel-bit error correction encoding is 14.

For the first bit, the error correction encoder 231 divides the polynomial representing a received data stream by the following formula (2).

$$X^{14} + X^{10} + X^6 + X + 1 \quad (2)$$

to calculate the remainder as the value of the check bit, and sends it sent to the check bit output terminal 1.

For the second to eighth bits, the error correction encoders 232–238 calculate the values of the check bits similarly from the polynomial of the data stream and send the results to the check bit output terminals 2–8.

The $\{n, k\} = \{9446, 9432\}$ shortened Hamming code is executed for each bit by inserting these check bits into the undefined bytes of the MSOH. n−k=14, which is the number of check bits. Therefore, the AU-4-4c and 4 AU-4 signals may be encoded by 14 bytes of check bits.

The following explains the error correction decoding operation. Fourteen bytes of check bits and AU-4-4c or 4 AU-4 signals are sent to the error correction decoding circuit 25 and then converted to 8 parallel signals by the error correction encoding circuit 20 and the serial/parallel conversion circuit 27.

For each of 8-parallel-bits, the error correction decoders 281–288 calculate the syndrome using 14 check bits and received data, and sends the calculation results to the syndrome output terminals 1–8 for error correction of each bit.

As described above, when the parallel type shortened Hamming code is used for AU-4-Xc ($2 \leq X \leq 16$) or X AU-4 ($2 \leq X \leq 16$) of the STM-N signal, the first embodiment according to the present invention reduces the number of check bits by using the shortened type Hamming code for each bit of 8-parallel-bits, one unit of AU-4-Xc or AU-4×X at a time.

Figure 5:
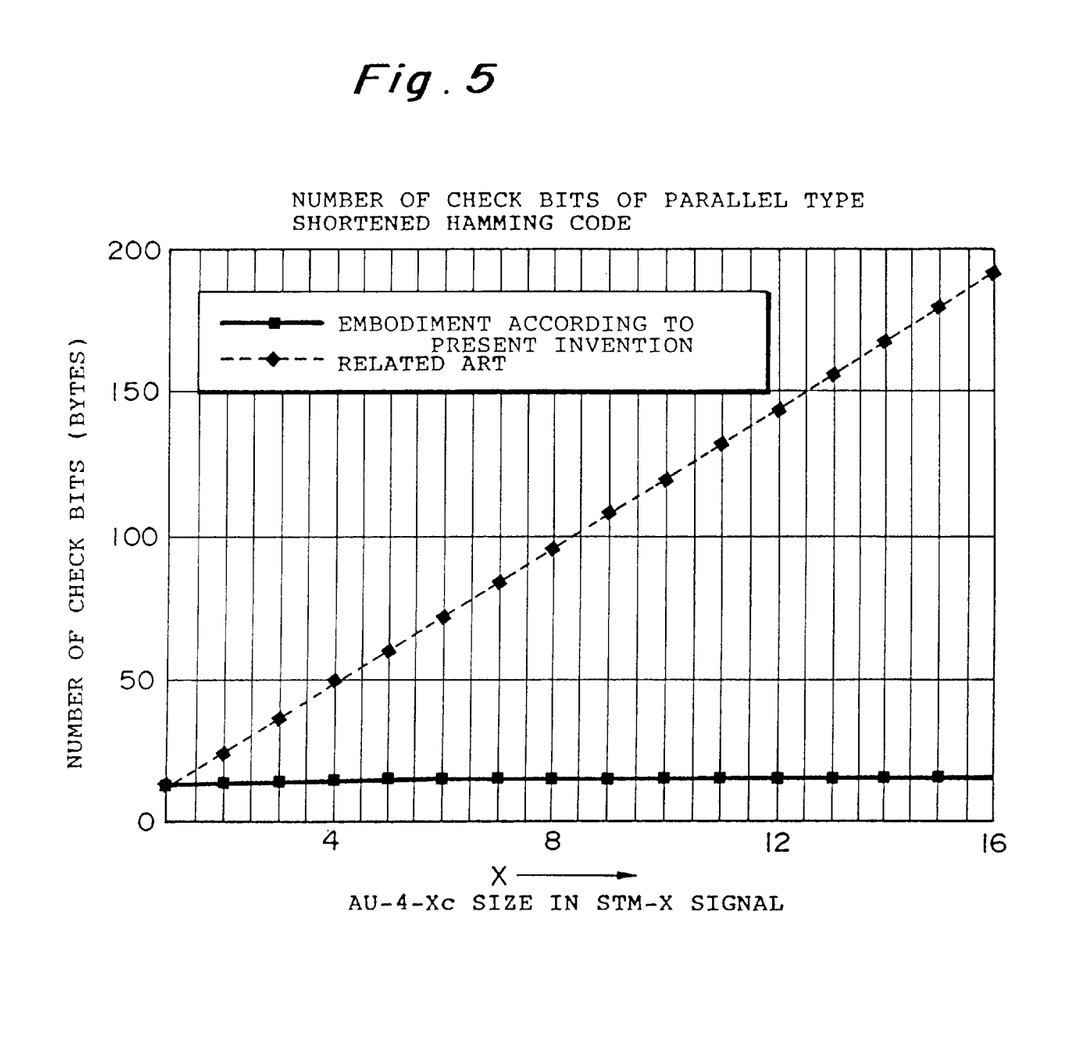
FIG. 5 is a diagram showing the number of check bits of the first embodiment.

FIG. 5 compares the number of check bits required by the embodiment according to the present invention with that required by the conventional method. For example, for AU-4-4c or 4 AU-4 signals, 48 bytes of check bits are required by the conventional method while 14 bytes are required by the first embodiment.

Even when the value of N in STM-N becomes larger, this embodiment can perform transmission error correction with an extremely small number of check bits (error correction code). Therefore, this embodiment is ideal for an SDH fiber optical transmission system which ensures high-speed data transmission.

SECOND EMBODIMENT

The second embodiment performs the error correction function on AU-4-Xc or X×AU-4 of the STM-N signal with the use of the serial type shortened Hamming code. To do so, it provides encoders and decoders to encode or decode one unit of AU-4-Xc or X×AU-4 at a time, instead of encoding and decoding circuits which encode and decode one unit of AU-4 at a time as in the conventional method.

Figure 6A:
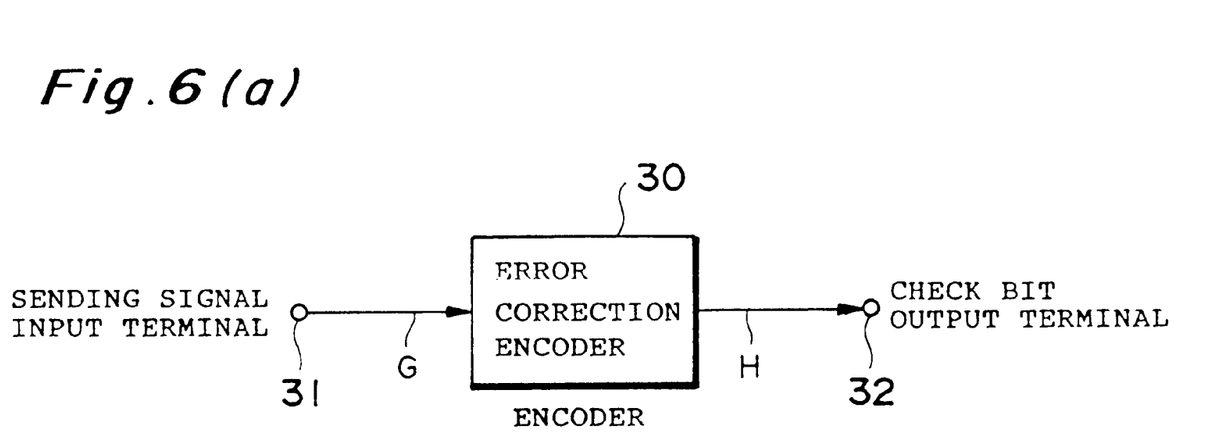
FIG. 6(a) illustrates the error correction encoder using the serial type shortened Hamming code, and FIG. 6 (b) illustrates the error correction decoder using the serial type shortened Hamming code.
Figure 6B:
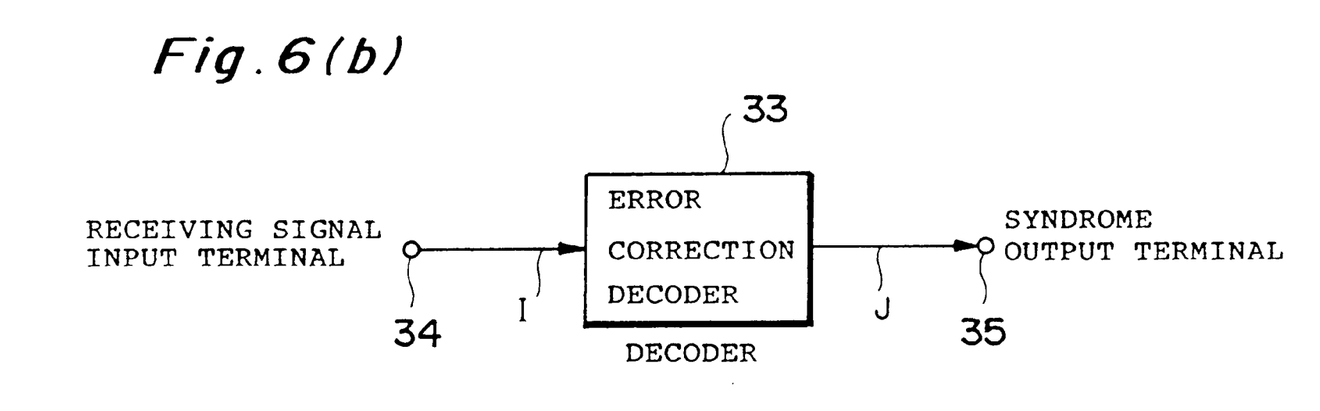

FIG. 6 (a) is a diagram showing the error correction encoder 30 using the serial type shortened Hamming code, and FIG. 6 (b) is a diagram showing the error correction decoder 33 using the serial type shortened Hamming code. The error correction encoder 30 performs $\{n, k\}$ shortened Hamming encoding on AU-4-Xc ($2 \leq X \leq 16$) of the STM-N signal, in which check bits are not inserted, to do one-bit error correction, and sends the generated check bits to the check bit output terminal. Note that N=4 and X=4 are assumed in this embodiment. The error correction decoder 33 detects an error bit position in the STM-N signal in which check bits are inserted, corrects the signal at the bit position, and outputs the corrected result to the syndrome output terminal.

Figure 7:
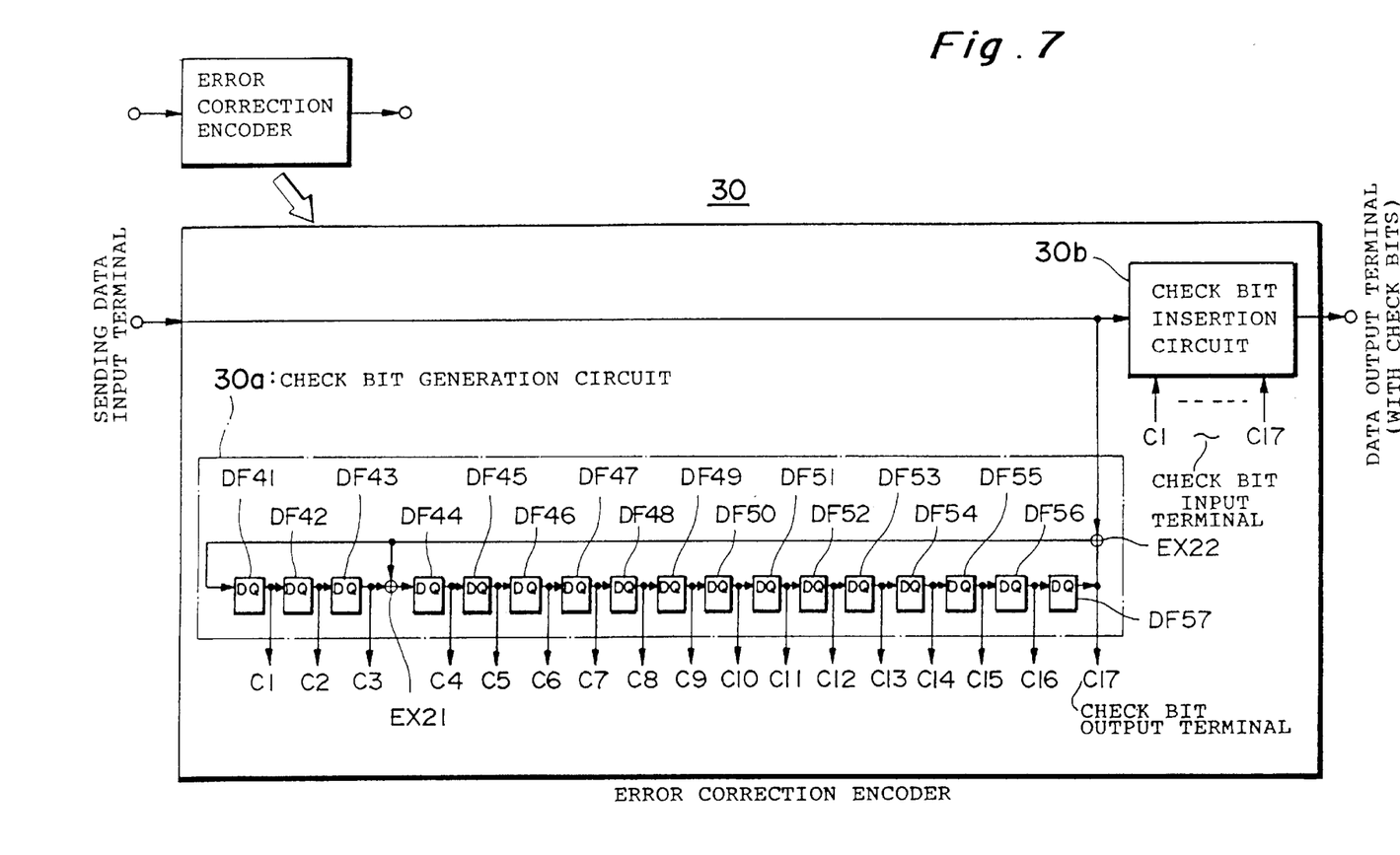
FIG. 7 is a detailed block diagram showing the error correction encoder using the serial type shortened Hamming code of the second embodiment.

FIG. 7 is a detailed functional configuration diagram of the error correction encoder 30 using the serial type shortened Hamming code. As shown in FIG. 7, the error correction encoder 30 using the serial type shortened Hamming code includes the check bit generation circuit 30a and the check bit insertion circuit 30b. The check bit generation circuit 30a includes the D flip-flop circuits DF41–DF57 and exclusive OR circuit Ex21–Ex22 to form a cyclic code generation circuit.

The check bit generation circuit 30a generates the $\{n, k\}$ shortened Hamming codes C1–C17 for one-bit error correction from the STM-N signal received at the sending signal input terminal, and sends the resulting codes to the check bit insertion circuit 30b. The check bit insertion circuit 30b then inserts the check bits C1–C17 into the vacant bit positions (FIG. 2) in the section overhead of the STM-N signal and sends the resulting data to the output terminal (with check bits).

Figure 8:
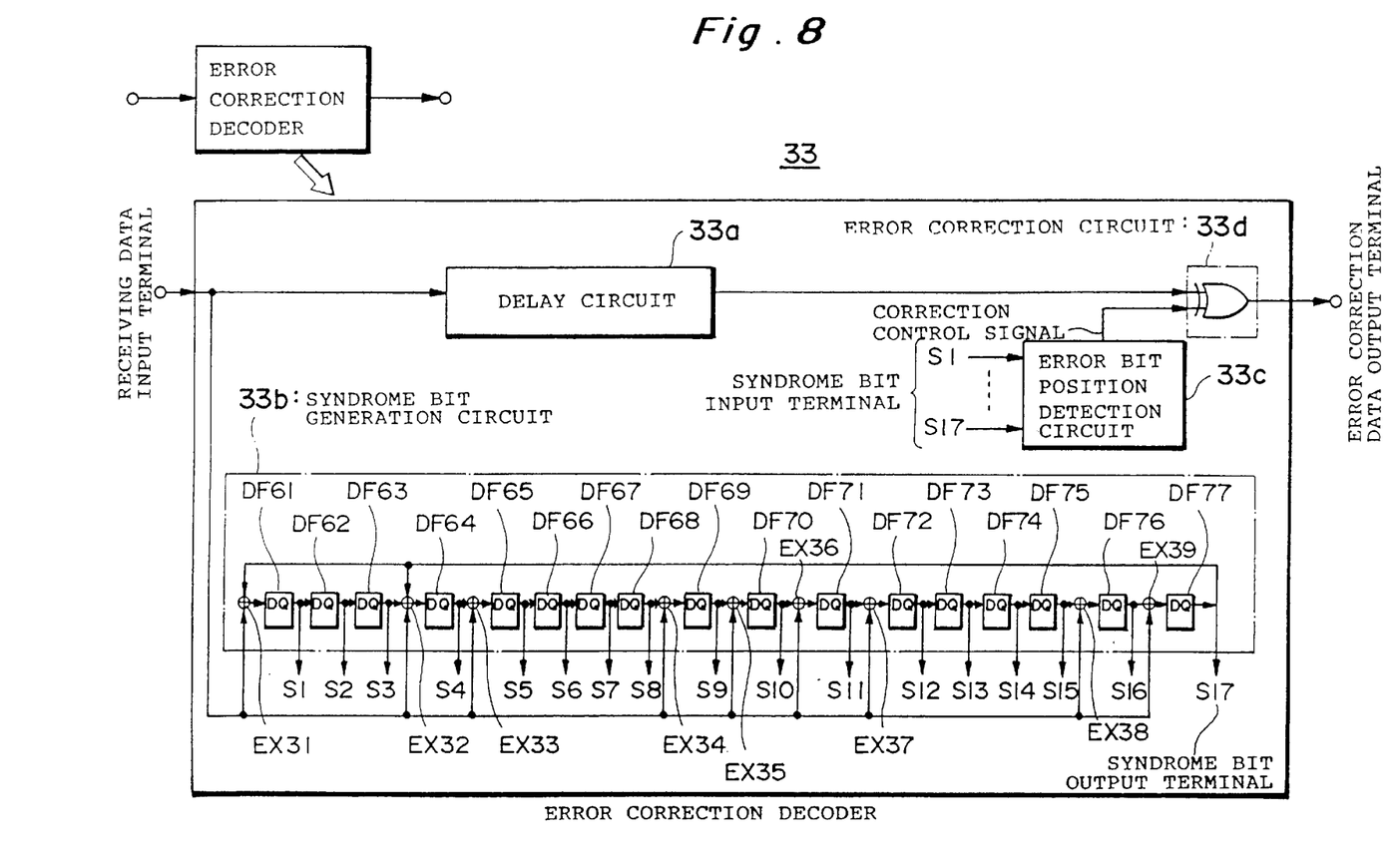
FIG. 8 is a detailed block diagram showing the error correction decoder using the serial type shortened Hamming code of the second embodiment.
Figure 9:
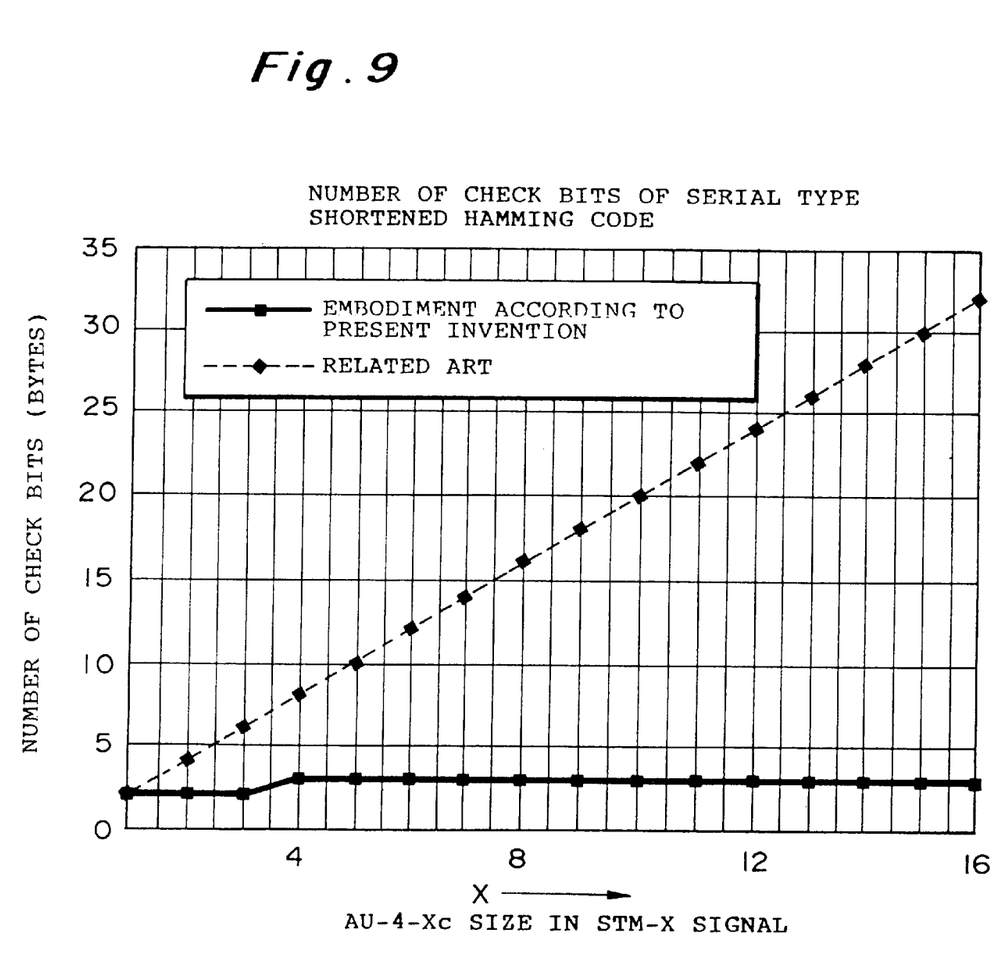
FIG. 9 is a diagram showing the number of check bits of the second embodiment.

FIG. 8 is a diagram showing the functional configuration of the error correction decoder 33 using the serial type shortened Hamming code. In FIG. 8, the error correction decoder 33 includes the delay circuit 33a, syndrome bit generation circuit 33b, error bit position detection circuit 33c, and error correction circuit 33d. The syndrome bit generation circuit 33b includes the D flip-flop circuits DF61–DF77 and exclusive OR circuits Ex31–Ex39.

The delay circuit 33a delays the STM-N signal received at the receiving data input terminal for the period of time equivalent to one frame of information bits, and sends the resulting signal to the error correction circuit 33d. The syndrome bit generation circuit 33b calculates the syndrome of the STM-N signal received at the receiving data input terminal and sends the syndrome bits S1 to S17 to the error bit position detection circuit 33c. The error bit position detection circuit 33c then detects an error bit position based on the syndrome bits S1–S17, generates the error control signal, and sends it to the error correction circuit 33d.

The error correction circuit 33d corrects the error signal of the STM-N signal, delayed by the delay circuit 33a, using the above-mentioned error control signal, then sends the corrected data to the data output terminal. For example, if the correction control signal is 1 indicating that there is an error and if the signal from the delay circuit 33a is 1, the circuit performs exclusive OR on them to output corrected data as 0; if the correction control signal is 1 and if the signal from the delay circuit 33a is 0, the circuit outputs 1. On the other hand, if the correction control signal is 0 indicating that there is no error and if the signal from the delay circuit 33a is 1 if the correction control signal is 0 and, the circuit outputs 1; if the signal from the delay circuit 33a is 0, the circuit outputs 0.

The following explains the operation of the error correction encoding/decoding operation using the serial type shortened Hamming code according to the second embodiment. In the following discussion, N=4 and X=4 are assumed for AU-4-Xc ($2 \leq X \leq 16$) of the STM-N signal. Both the AU-4-4c and four AU-4 signals each have 75456 bits ($=\{261 \times 4 \times 9 \times 8\}+\{9 \times 4 \times 8\}$) in one frame.

This signal is sent to the sending signal input terminal 31 for encoding. In general, 17 bits are required for the {n, k} shortened Hamming code as calculated by the above formula (1). The error correction encoder 30 divides the polynomial representing a received data stream by the following formula (3).

$$X17+X3+1 \tag{3}$$

to calculate the remainder as value of the check bit, and sends it to the check bit output terminal 32.

The {75473, 75456} shortened Hamming code is executed by inserting these check bits into the undefined bytes of the MSOH. However, since data in the STM-N signal is represented in 8-bit bytes, the number of check bits inserted into the MSOH in the SOH for error correction encoding is equivalent to 3 bytes. As a result, AU-4-Xc or four AU-4 signals can be encoded by 3-byte check bits.

The following explains the error correction decoding operation. Three bytes of check bits and AU-4-4c or 4 AU-4 signals are sent to the receiving signal input terminal 34. The error correction decoder calculates the syndrome using 3 bytes of check bits and received data, and sends the calculation results to the syndrome output terminal 35 for error correction decoding.

The above embodiments use the {n, k} Hamming code for one-bit error correction only. Two-bit or higher-bit error correction is also possible. For example, a code for random errors, burst errors, or byte errors should be used. In addition, the block code or the convolutional code should be used. The block code includes not only the Hamming code, but the extended Hamming code, BCH code, Fire code, Kou code, and Reed-Solomon code. The convolutional code includes Viterbi decode, sequential decode, self-orthogonal code, Iwadare code, and Hagelbarger code.

Further, generated check bits may be inserted into any positions in the section overhead except the pointer area. Preferably, they should be inserted into the unused areas shown in FIG. 2.

As described above, it is an object of the present invention to provide an error correction encoding and decoding method for encoding or decoding the STM-N signal containing a plurality of multiplexed administrative units, a plurality of administrative units at a time. This method facilitates transmission error correction by simply generating an extremely small number of error correction codes even when the value of N in STM-N becomes large.

What is claimed is:

1. A synchronous transport module level N (STM-N) signal error correction coding system, N being a positive integer, comprising:

administrative unit generating means for generating a plurality of administrative units, each of the administrative units including a virtual container for accommodating transmission data and a pointer having information on multiplexing of the data;

error correction code generating means for generating one error correction code for the whole of the plurality of administrative units; and STM-N signal generating means for generating an STM-N signal having an overhead section and a payload section by setting the error correction code in the overhead section and setting the plurality of administrative units in the payload section.

2. A synchronous transport module level N (STM-N) signal error correction coding system, N being a positive integer, comprising:

error correction code generating means for generating a one bit error correction code for the whole of a plurality of administrative units within an STM-N signal; and error correction code decoding means for decoding the one bit error correction code for the whole of the plurality of administrative units within the STM-N signal.

3. A synchronous transport module level N (STM-N) signal error correction coding system, N being a positive integer, comprising:

a first step of generating a plurality of administrative units, each of the administrative units including a virtual container for accommodating transmission data and a pointer having information on multiplexing of the data;

a second step of generating one error correction code for the whole of the plurality of administrative units; and a third step of generating an STM-N signal having an overhead section and a payload section by setting the error correction code in the overhead section and setting the plurality of administrative units in the payload section.

4. A synchronous transport module level N (STM-N) signal error correction coding system, N being a positive integer, comprising:

a first step of generating a one bit error correction code for the whole of a plurality of administrative units within an STM-N signal;

a second step of generating an STM-N signal having an overhead section and a payload section by setting the error correction code in the overhead section;

a third step of detecting the one bit error correction code for the whole of the plurality of administrative units from the received STM-N signal;

a fourth step of detecting an error bit position using the received error correction code and received administrative units within the received STM-N signal; and a fifth step of correcting an error bit of the received STM-N signal using the error bit position information.

* * * * *